United States Patent
Ponier (10) Patent No.: US 12,281,891 B2
(45) Date of Patent: Apr. 22, 2025

(54) METHOD AND APPARATUS FOR CHECKING THE ALIGNMENT OF A MOTOR VEHICLE HEADLAMP

(71) Applicant: Ford Global Technologies, LLC, Dearborn, MI (US)

(72) Inventor: Marcel Ponier, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 17/953,628

(22) Filed: Sep. 27, 2022

(65) Prior Publication Data

US 2023/0094908 A1  Mar. 30, 2023

(30) Foreign Application Priority Data

Sep. 27, 2021  (DE) .......................... 102021124956.2

(51) Int. Cl.
  *G01B 11/27* (2006.01)
  *B60S 5/00* (2006.01)

(52) U.S. Cl.
  CPC ................ *G01B 11/27* (2013.01); *B60S 5/00* (2013.01)

(58) Field of Classification Search
  CPC ........ G01B 11/27; B60S 5/00; G01M 11/062; G01M 11/064; G01M 11/06; G01J 1/4257; G01J 1/10; B60Q 1/0023
  See application file for complete search history.

(56) References Cited

U.S. PATENT DOCUMENTS

| | | | | |
|---|---|---|---|---|
| 2,144,838 A | * | 1/1939 | Falge | G01M 11/061 33/613 |
| 2,411,879 A | * | 12/1946 | Holmes | G01M 11/061 356/121 |
| 2,913,824 A | * | 11/1959 | Drennan | G01M 11/062 356/121 |
| 2,979,822 A | * | 4/1961 | Wilkerson | G01M 11/062 33/645 |
| 4,226,530 A | * | 10/1980 | Broom | G01M 11/062 356/121 |
| 5,373,357 A | * | 12/1994 | Hopkins | G01M 11/064 356/121 |
| 5,428,510 A | * | 6/1995 | Shirai | B60Q 1/007 362/462 |

(Continued)

FOREIGN PATENT DOCUMENTS

| | | |
|---|---|---|
| CN | 86104318 | 12/1987 |
| DE | 102012016441 | 2/2014 |

(Continued)

*Primary Examiner* — Mohamed K Amara
(74) *Attorney, Agent, or Firm* — Burris Law, PLLC (57) ABSTRACT

An alignment checking apparatus holder to assist checking of the alignment of a motor vehicle headlamp installed in a body of a motor vehicle includes a base body, at least one reference marking on the base body, and a multiple of form-fit elements. The base body is visually perceptible from the outside in a checking position. The multiple of form-fit elements are rigidly connected to the base body and are intended to form form-fit connections with parts of the motor vehicle headlamp or of the body of the motor vehicle. The at least one reference marking has a predetermined position with respect to the multiple of form-fit elements.

20 Claims, 4 Drawing Sheets

(56) References Cited

U.S. PATENT DOCUMENTS

| | | | |
|---|---|---|---|
| 8,605,269 B2 * | 12/2013 | Yotz | ................... G01M 11/064 |
| | | | 382/104 |
| 9,366,568 B2 | 6/2016 | Brosinger | |
| 2007/0165416 A1 | 7/2007 | Ishida et al. | |
| 2012/0224171 A1 * | 9/2012 | Yotz | ................... G01M 11/064 |
| | | | 356/121 |

FOREIGN PATENT DOCUMENTS

| | | | | |
|---|---|---|---|---|
| EP | 2998718 A1 * | 3/2016 | ............ | G01M 11/06 |
| KR | 101481020 | 1/2015 | | |
| WO | WO-2019141576 A1 * | 7/2019 | ............. | B60Q 1/068 |

\* cited by examiner

METHOD AND APPARATUS FOR CHECKING THE ALIGNMENT OF A MOTOR VEHICLE HEADLAMP

CROSS-REFERENCE TO RELATED APPLICATION

This application claims priority to and the benefit of German Patent Application No. 102021124956.2, filed on Sep. 27, 2021. The disclosure of the above application is incorporated herein by reference.

FIELD

The present disclosure relates to a method and system for checking the alignment of a motor vehicle headlamp installed in a body of a motor vehicle by application of a headlamp checking apparatus.

BACKGROUND

The statements in this section merely provide background information related to the present disclosure and may not constitute prior art.

In the field of automotive engineering, the use of headlamps with a dip-beam function, in particular with asymmetric road illumination, is conventional. With dip-beam light, the road in front is illuminated with a dip beam inclined slightly downward in order to inhibit dazzling drivers of oncoming vehicles. In the case of asymmetric dip-beam light, the edge of the lane on the side of the road being driven on is illuminated more widely than the opposite lane, so that visibility of objects at the edge of the road can be increased without risk of dazzling the oncoming traffic.

In order to inhibit dazzling by the dip-beam light during continual use of the motor vehicle, regular checking of the headlamp adjustment carried out in the factory during the production of the motor vehicle is generally necessary. In order to adjust the headlamps, headlamp setting equipment is used, which can represent and evaluate a light distribution generated by the headlamp and in particular its light/dark boundary, for example on the basis of a camera. Often, laser sights are used in order to align the headlamp setting equipment accurately with the longitudinal axis of a body of the motor vehicle.

Because of the variety of different variations of motor vehicle headlamps, individual alignment of an adjustment axis of the headlamp setting equipment with an optical axis of the headlamp is necessary in order to prepare for the setting. In the prior art, solutions to simplify the adjustment of motor vehicle headlamps have therefore been proposed in a variety of ways.

For example, Korean Patent Application No. 101481020 B1 describes a film in a headlamp checking apparatus, which is applied on a window opening and is matched thereto, and which receives light from a headlamp of a vehicle in question. The film is configured as a transparent film, which comprises a reference position mark for the optical axis and error indicator markings upward and downward as well as to the left and right, at a particular distance from the reference position mark. The film makes it possible for a person to check the shape and position of a light distribution pattern reflected in the window opening from outside the window with the naked eye. It is readily possible with the naked eye at the location of the checking apparatus to determine whether there is a deficiency in the alignment of the optical axis of a headlamp, without checking the latter using a display unit, by applying the film with the markings on the window opening of a conventional headlamp checking apparatus. The reliability of headlamp checking with a correction carried out can also be improved since it is possible to check a result of the correction of the optical axis of the headlamp. Even if a light detection unit or a controller of the headlamp checking apparatus is not functioning, it is possible to identify and correct the deficiency in the alignment of the optical axis of the headlamp in an approximate or simplified way on the basis of the headlamp light distribution pattern formed on the film for the headlamp checking apparatus.

Furthermore, Chinese Patent Application No. 86104318 B discloses a measuring device for motor vehicle headlamps. The measuring device contains a movement-guiding rod sleeve, an optical lens system, an observation table with a calibration pattern, an optical machine measuring apparatus connected to the optical lens system, and an optical setting system. The optical setting system consists of a setting mirror with an observation display mark and two viewfinders. The measurement process of the measuring device consists in aligning the optical setting system in relation to the image of the vehicle body by successively using the two viewfinders in order to bring images of two symmetrical points on the vehicle body, which are reflected by the setting mirror, into congruence.

In addition, U.S. Patent Publication No. 2007/0165416 A1 discloses a vehicle headlamp which provides a predetermined light distribution pattern by combining illumination light beams that are respectively emitted by a plurality of light source units, each of which uses a light emission element as light source. At least one of the plurality of light source units is a light source unit forming a "hot zone" in the light distribution pattern. The "hot zone" is a region in front of the vehicle along a light/dark boundary which defines an illumination region in order to inhibit drivers in the oncoming traffic from being dazzled. In one form, it is necessary to detect a reference position for each lamp (referred to as "lamp center") so that the lamp center can be positioned and aligned with a light distribution pattern tester of the headlamp test equipment. The lamp center is provided in a light emission region of the light source unit, forming the hot zone, and a center marking which indicates the lamp center is provided on the front cover of the lamp. The center marking is detected by using the reflection of two mutually perpendicularly arranged vertical and horizontal laser beams of an imaging apparatus. In this way, it is possible with a high degree of precision to detect the lamp center of the headlamp and align it with the optical axis of the imaging apparatus, or to align the optical axis of a headlamp test apparatus with an elbow point of a light distribution pattern of the headlamp, so that a subsequent test of the light distribution pattern can be carried out accurately.

Furthermore, other checking apparatuses for motor vehicle headlamps are known in the prior art.

For instance, German Patent Application No. 102012016441 A1 discloses a method and an apparatus for evaluating a quality of a headlamp of a motor vehicle, particularly in respect of homogeneity of the light distribution, tendency to flicker and stability of the light/dark boundary of the headlamp during driving operation and/or during operation on a vibration test rig, during which the headlamp is observed using a camera and a camera image and/or a chronological sequence of camera images is/are evaluated according to at least one predetermined criterion, for example a brightness distribution. In this way, reliable and reproducible quantitative quality control of headlamps is possible. The apparatus contains a light box which can be fastened on the motor vehicle so that the headlamp shines into the light box. In this case, the light box contains a camera for observing the headlamp. The fastening of the light box may be carried out using bars fastened on the light box, which are fastened with suction cups on the outer paneling of the motor vehicle. A computing machine is provided for evaluating the image data recorded by the camera.

In view of the prior art described above, the field of methods and apparatuses for checking or adjusting headlamps of motor vehicles still has room for improvement.

SUMMARY

This section provides a general summary of the disclosure and is not a comprehensive disclosure of its full scope or all of its features.

The present disclosure provides a method and an apparatus for carrying out the method which allows an easily and rapidly executable, highly reproducible checking or adjustment of a headlamp of motor vehicles.

It should be pointed out that the features and measures mentioned individually in the description below may be combined with one another in any technically expedient way, and represent further configurations of the disclosure. The description additionally characterizes and specifies the disclosure, in one form in conjunction with the figures.

The alignment checking apparatus holder according to the disclosure is used to assist checking of the alignment of a motor vehicle headlamp installed in a body of a motor vehicle, the alignment checking apparatus holder containing a base body. The alignment checking apparatus holder comprises at least one reference marking on the base body, which is visually perceptible from the outside in a checking position. The alignment checking apparatus holder is furthermore equipped with a multiplicity or multiple of form-fit elements. The form-fit elements are rigidly connected to the base body and are intended to make a form-fit connection respectively with a corresponding form-fit element which is part of the motor vehicle headlamp or of the body of the motor vehicle, so that there are form-fit connections in two mutually independent spatial directions.

In this case, the at least one reference marking has a predetermined position with respect to the multiplicity of form-fit elements.

The term "multiplicity" or "multiple" for the purposes of the disclosure is intended in one form to be a number of at least two. The term "intended to" for the purposes of the disclosure is intended in one form to mean specially configured or arranged.

The proposed alignment checking apparatus holder can substantially facilitate checking and adjustment of a motor vehicle headlamp installed in a motor vehicle by the ability to bring about a spatial relation with a reference point on a front side of the motor vehicle headlamp, in one form a main light exit point, using the at least one reference marking. In this case, a geometrical relation between the body of the motor vehicle and the reference point of the vehicle headlamp is established by the form-fit connections in two mutually independent spatial directions.

In one form, the proposed alignment checking apparatus holder allows the application of an optical reference point on the motor vehicle headlamp, such as is known for instance from the prior art, to be dispensed with.

In one form, the at least one reference marking is configured in the form of a symbol on a front upper side of the base body. The term "in front" used in this application and forms derived therefrom refer to a forward driving direction of the motor vehicle. By this configuration of the at least one reference marking, a predetermined spatial arrangement of a reference marking at a predetermined distance outside the motor vehicle with respect to the reference point of the motor vehicle headlamp, which is desired for adjusting the motor vehicle headlamp, can be established in a particularly simple way through the spatial relation with the reference point on a front side of the motor vehicle headlamp.

In some forms of the alignment checking apparatus holder, the at least one reference marking is arranged on a front upper side of the base body and is configured as a starting point of a light beam. In this way, a spatial relation with the reference point on the front side of the motor vehicle headlamp can be established for the starting point of the light beam, using the predetermined spatial arrangement of the reference marking at a predetermined distance outside the motor vehicle with respect to the reference point of the motor vehicle headlamp can be achieved easily.

In one form, the two mutually independent spatial directions in which the form-fit connections exist are arranged in a substantially horizontal plane. In this way, particularly simple placement of the alignment checking apparatus holder on the motor vehicle headlamp or the body of the motor vehicle, in one form on an upper edge of an engine compartment arranged at the front, can be made possible.

Of the multiplicity of form-fit elements, individual or several form-fit elements may be configured as latch elements which are intended to establish a temporary latch connection respectively with a corresponding latch element which is part of the motor vehicle headlamp or of the body of the motor vehicle.

In one form, the form-fit elements of the multiplicity of form-fit elements may be arranged at positions where the respectively corresponding form-fit element, which is part of the motor vehicle headlamp or of the body of the motor vehicle, is formed by a particularly prominent feature of the motor vehicle headlamp or of the body of the motor vehicle, or is in a fixed geometrical connection thereto. In this way, intended application of the alignment checking apparatus holder on the motor vehicle headlamp or the body of the motor vehicle for checking purposes can be substantially simplified by establishing the form-fit connections.

In one form, the form-fit elements are configured as protrusions, substantially arranged horizontally in a checking position, of the base body in two mutually independent spatial directions, from the end regions of which at least one web element respectively overhangs the protrusion in a downward direction. This variation can allow a particularly simple and reliable establishment of form-fit connections, in one form with form-fit elements which are arranged or formed on the motor vehicle headlamp or the body of the motor vehicle, in one form on an upper edge of an engine compartment arranged at the front.

In one form, the two mutually independent spatial directions in which the horizontally arranged protrusions of the base body are configured are formed by mutually perpendicularly aligned horizontal spatial directions. In this way, particularly simple establishment of the form-fit connections on a corner region of the motor vehicle headlamp or a corner region of the body of the motor vehicle, in one form a corner region on an upper edge of an engine compartment arranged at the front, can be made possible.

If the alignment checking apparatus holder comprises at least one gripping element, which is connected firmly to the base body and in a checking position is arranged on an upper side of the base body, handling of the alignment checking apparatus holder in order to establish the form-fit connections to assist checking of the alignment of a motor vehicle headlamp installed in a body of a motor vehicle can be facilitated.

In some forms of the alignment checking apparatus holder, the base body and the multiplicity of form-fit elements are formed in one piece. In this context, "formed in one piece" is intended to include materially bonded together (e.g., a welding process), or, advantageously include formed together (e.g., formed using a molding method). In this way, a desired mechanical strength of the multiplicity of form-fit elements and, concomitantly, a particular mechanical stability of the alignment checking apparatus holder can be achieved more easily. Furthermore, production of the alignment checking apparatus holder by using methods having known dimensional accuracy, with which extensive experience can be employed, can be made particularly easy.

In another aspect of the disclosure, a headlamp checking apparatus for checking the alignment of a motor vehicle headlamp installed in a body of a motor vehicle is proposed. The headlamp checking apparatus comprises an variation of the alignment checking apparatus holder according to the disclosure and at least one light source, which is intended for the emission of a light beam, using a spatial relation between a predetermined reference marking on a projection surface at a predetermined distance outside the motor vehicle and the at least one reference marking on the base body can be established.

The advantages described in connection with configurations and refinements of the alignment checking apparatus holder are applicable in full scope to the headlamp checking apparatus.

In some forms, the headlamp checking apparatus comprises two light sources, and the base body of the alignment checking apparatus holder comprises two reference markings. In this case, one of the light sources is held at the location of each of the reference markings and has a predetermined orientation with respect to the multiplicity of form-fit elements. Furthermore, the reference markings are arranged separated from one another in a direction transverse to a forward driving direction of the motor vehicle. By the incorporation of two light sources, a spatial relation can be brought about with two different reference points on a front side of the motor vehicle headlamp, which may respectively correspond for example to a main light exit point for a dip-beam function and a full-beam function of the motor vehicle headlamp.

In some variations of the headlamp checking apparatus, the one light source or at least one of the light sources includes a laser diode. In this way, it is possible to provide a light beam which in a particularly simple way allows a spatial relation with a reference point on the front side of the motor vehicle headlamp and a predetermined spatial arrangement of a reference marking at a predetermined distance outside the motor vehicle with respect to the reference point of the motor vehicle headlamp.

In one form, the light source containing a laser diode may be equipped with a collimator lens, which is arranged close to the laser diode, in order to generate a parallel beam. The construction of the at least one light source may be similar to the construction of a laser pointer known per se.

In another aspect of the disclosure, a method for checking the alignment of a motor vehicle headlamp installed in a body of a motor vehicle using a variation of the proposed headlamp checking apparatus is provided.

In one form, the method includes producing form-fit connections between each form-fit element of the alignment checking apparatus holder and the respective form-fit element corresponding thereto, which is part of the motor vehicle headlamp or of the body of the motor vehicle; operating the light source or operating the light sources in order to emit respectively at least one light beam between a projection surface having a multiplicity of predetermined adjustment markings at a predetermined distance in front of the motor vehicle and the alignment checking apparatus holder; ascertaining a position of the light beam or positions of the light beams on the projection surface in relation to a respective reference marking on the projection surface or on the base body in relation to the at least one reference marking; and adjusting the projection surface in a plane arranged perpendicularly to the forward driving direction and at a predetermined distance from the base body until a position of the light beam or positions of the light beams coincides with the respective reference marking on the projection surface or a position of the light beam or positions of the light beams coincides respectively with one of the reference markings on the base body; and comparing a light distribution of the motor vehicle headlamp with the multiplicity of predetermined adjustment markings of the projection surface.

If the result of the step of comparing the light distribution with the multiplicity of predetermined adjustment markings differs from a desired setting, the method in one form includes a step of releasing the form-fit connections between the base body and the corresponding form-fit elements and a step of removing the headlamp checking apparatus from the checking position, and also a step of adjusting an optical axis of the headlamp according to the multiplicity of predetermined adjustment markings on the projection surface.

With the proposed method, checking and adjustment of a motor vehicle headlamp installed in a motor vehicle can be carried out in a substantially facilitated way.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the various figures, parts which are the same are always provided with the same references, for which reason they are generally described only once.

Figure 1:
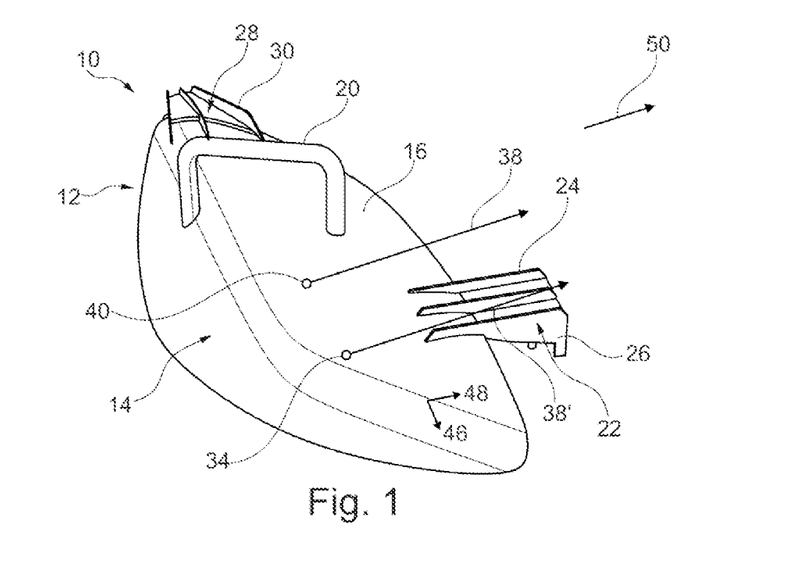
FIG. 1 is schematic perspective view of an alignment checking apparatus holder of a headlamp checking apparatus in the orientation of a checking position, in a view obliquely from above, according to the teachings of the present disclosure.

FIG. 1 shows a schematic perspective representation of one variation of the alignment checking apparatus holder 12 according to the disclosure of a headlamp checking apparatus 10 in a view obliquely from above. The alignment checking apparatus holder 12 is used to assist checking of the alignment of a motor vehicle headlamp installed in a body of a motor vehicle. FIG. 1 depicts the orientation of the alignment checking apparatus holder 12 in a checking position.

Figure 2:
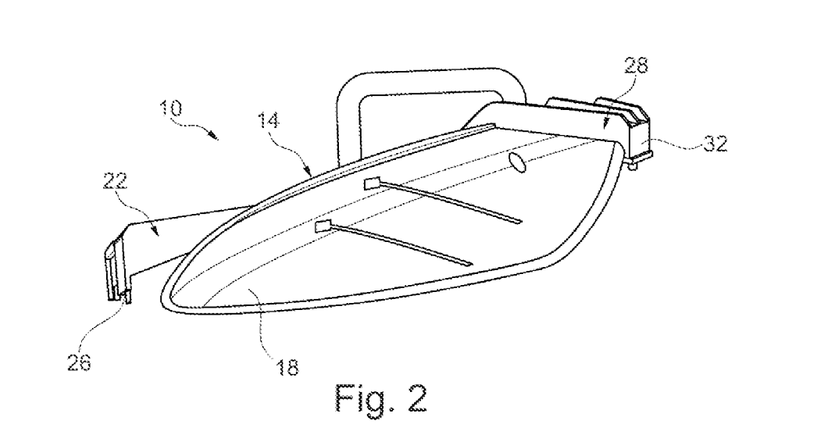
FIG. 2 is a schematic perspective representation of the alignment checking apparatus holder of FIG. 1 in a perspective view obliquely from below, according to the teachings of the present disclosure.

The alignment checking apparatus holder 12 comprises a base body 14 with an elongated oval general shape having a convexly configured upper side 16 and a concavely configured lower side 18 (FIG. 2). For better handling, in one form, the alignment checking apparatus holder 12 includes a gripping element 20 (FIG. 1) which is configured as a U-shaped handle, the ends of which are firmly connected to the base body 14. In the checking position represented in FIG. 1, the gripping element 20 is arranged on the upper side 16 of the base body 14.

The alignment checking apparatus holder 12 furthermore includes a multiplicity of two form-fit elements 22, 28, which are rigidly connected to the base body 14. The form-fit elements 22, 28 are configured as protrusions of the base body 14, which extend in two mutually independent spatial directions 46, 48. In the checking position, the form-fit elements 22, 28 are arranged substantially horizontally. Substantially parallel to their extent direction, the form-fit elements 22, 28 respectively comprise three reinforcing ribs 24, 30 to increase a bending stiffness.

From an end region of each of the form-fit elements 22, 28 which faces away from the base body 14, a web element 26, 32 jutting out at a right angle overhangs the protrusion in a downward direction (FIG. 2).

The base body 14 and the multiplicity of two form-fit elements 22, 28 may be formed in one piece. In one form, the base body 14 and the two form-fit elements 22, 28 may be produced from a thermoplastic in a combined injection-molding method. As an alternative, the base body 14 may initially be produced from an aluminum alloy employing a diecasting method and a plastic layer on the upper side and on the lower side and the two form-fit elements 22, 28 may subsequently be overmolded with a material bond in an injection-molding method.

The form-fit elements 22, 28 of the multiplicity of two form-fit elements 22, 28 are intended to make a form-fit connection in the checking position respectively with a corresponding form-fit element which is part of the motor vehicle headlamp or of the body of the motor vehicle, so that there are form-fit connections in two mutually independent spatial directions. The two mutually independent spatial directions respectively correspond to the spatial directions 46, 48 in which the two form-fit elements 22, 28 extend.

The base body 14 comprises two reference markings 34, 40, each of which has a predetermined position with respect to the multiplicity of form-fit elements 22, 28. The two reference markings 34, 40 are arranged on the front upper side 16 of the base body 14 and are readily perceptible visually from the outside in the checking position. The two reference markings 34, 40 may respectively be configured in the form of a symbol, in one form a round point or a cross.

Using the two reference markings 34, 40, a spatial relation can be brought about with two different reference points on a front side of the motor vehicle headlamp, which respectively correspond to a main light exit point for a dip-beam function and a full-beam function of the motor vehicle headlamp.

The two reference markings 34, 40 are arranged separated from one another in a direction transverse to a forward driving direction 50 of the motor vehicle (FIG. 1).

Each of the two reference markings 34, 40 is intended as a target of a light beam 38, 38', using a spatial relation can be established between a predetermined reference marking on a projection surface at a predetermined distance outside the motor vehicle and one of the reference markings 34, 40 on the base body 14, as will be explained below.

Figure 3:
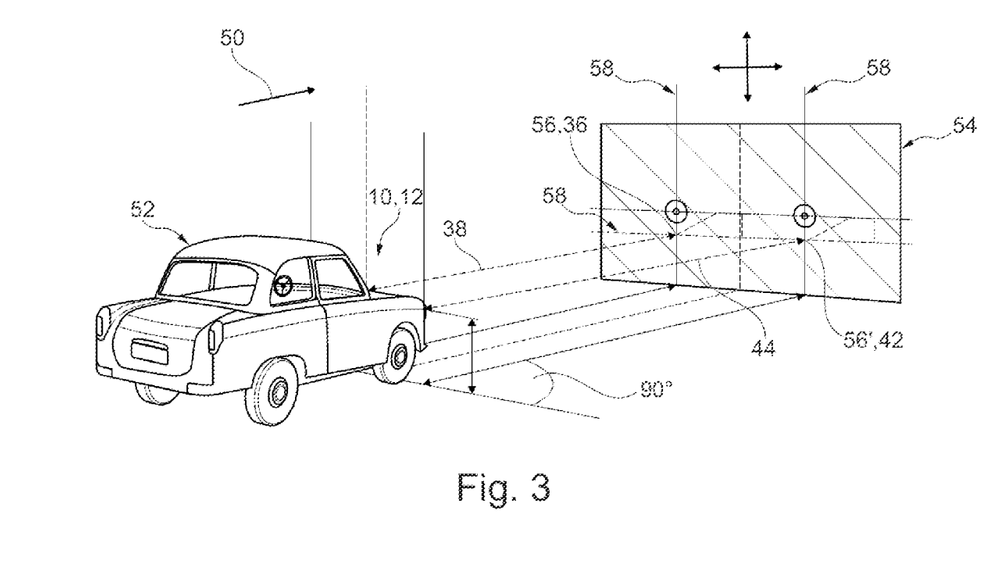
FIG. 3 is a schematic perspective representation of a headlamp checking apparatus comprising the alignment checking apparatus holder of FIGS. 1 and 2 during the checking of the alignment of a motor vehicle headlamp installed in a body of a motor vehicle, according to the teachings of the present disclosure.

FIG. 3 shows a schematic perspective representation of the headlamp checking apparatus 10 comprising the alignment checking apparatus holder 12 according to the disclosure according to FIGS. 1 and 2 during the checking of the alignment of a motor vehicle headlamp installed in a body of a motor vehicle 52.

The motor vehicle 52, configured as a car, is arranged at a predetermined distance, in one form at a distance of 10 m, from a projection surface 54, the forward driving direction 50 of the motor vehicle 52 being aligned perpendicularly to the projection surface 54. The projection surface 54 includes a multiplicity of predetermined adjustment markings 58. Two of the adjustment markings 58 are formed by vertical lines which are arranged separated from one another symmetrically in relation to a center of the projection surface 54. In this case, the vertical line arranged on the left is assigned to the left motor vehicle headlamp and the vertical line arranged on the right is assigned to the right motor vehicle headlamp. A further adjustment marking 58 is arranged horizontally and is assigned to both motor vehicle headlamps. The projection surface is configured to be displaceable and lockable in the horizontal and vertical directions.

The headlamp checking apparatus 10 includes the alignment checking apparatus holder 12 to assist checking of the alignment of the motor vehicle headlamp installed in the body of the motor vehicle 52, and also two light sources 36, 42 which is arranged in a fixed position on reference markings 56, 56' of the projection surface 54. In this case, a reference marking 56 arranged on the left and one 36 of the light sources 36, 42 are assigned to the left motor vehicle headlamp, and a reference marking 56' arranged on the right and the other 42 of the two light sources 36, 42 are assigned to the right motor vehicle headlamp. The light sources 36, 42 respectively contain a laser diode and a collimator lens arranged close to the laser diode, similar to the arrangement in a laser pointer, so that a substantially parallel light beam 38, 38', 44 which is directed at the motor vehicle 52 and in one form at the alignment checking apparatus holder 12 is generated during operation of each of the laser diodes.

Figure 4:
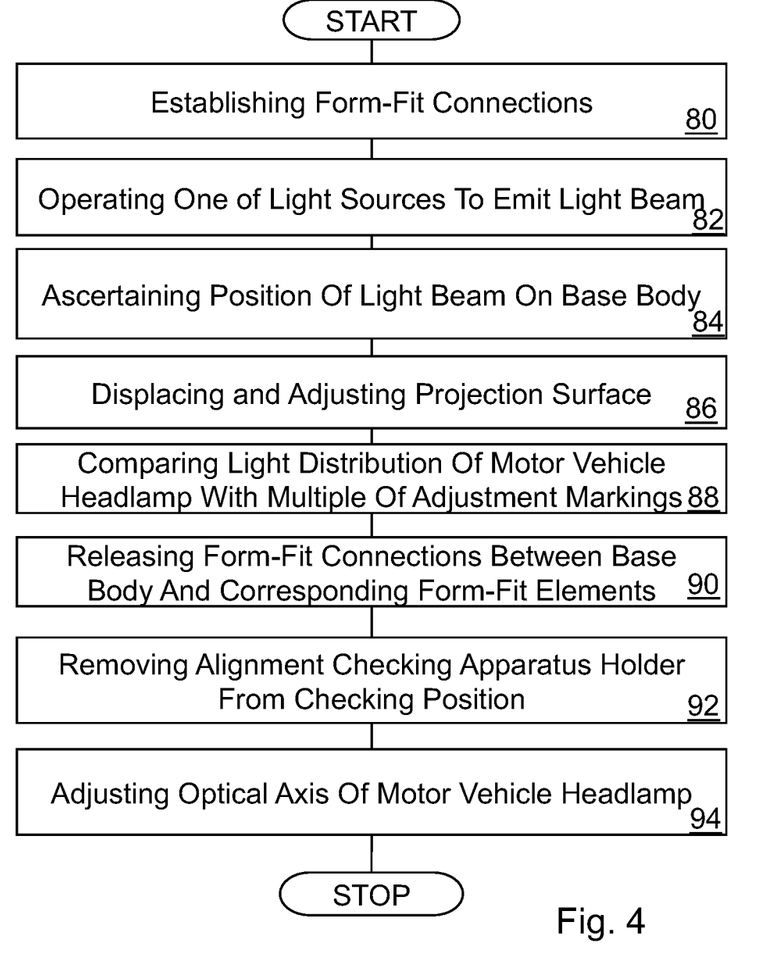
FIG. 4 is a flowchart of a method according to the disclosure for checking the alignment of the motor vehicle headlamp according to FIG. 3 employing the headlamp checking apparatus according to FIGS. 1 and 2, according to the teachings of the present disclosure.

In one form, according to the disclosure of a method according to the disclosure for checking the alignment of the motor vehicle headlamp installed in a body of the motor vehicle 52 employing the headlamp checking apparatus 10 will be explained below with the aid of FIGS. 1 and 3 and a flowchart, which is shown in FIG. 4.

In preparation for carrying out the method, it is assumed that all the apparatuses and components involved are in a state ready for operation.

In a step 80 of the method, form-fit connections are established between each form fit element 22, 28 of the alignment checking apparatus holder 12 and the form-fit element respectively corresponding thereto, which is part of the motor vehicle headlamp or of the body of the motor vehicle 52.

One of the light sources 36 is operated in a further step 82 in order to emit a light beam 38 from the projection surface 54 to the alignment checking apparatus holder 12. In a subsequent step 84, the position of the light beam 38 on the base body 14 of the alignment checking apparatus holder 12 in relation to one of the reference markings 40 is ascertained. The projection surface 54 is displaced and adjusted in the horizontal and/or vertical direction in a further step 86 until a position of the light beam 38 on the base body 14 coincides with the selected reference marking 40.

In a subsequent step 88 of the method, a light distribution of the motor vehicle headlamp, in one form its light/dark boundary, is compared with the multiplicity of adjustment markings 58. If the result of the comparison step 88 differs from a desired setting, in a further step 90 the form-fit connections between the base body 14 and the corresponding form-fit elements are released and, in the next step 92, the alignment checking apparatus holder 12 is removed from the checking position. In a final step 94, the optical axis of the motor vehicle headlamp is adjusted until the light/dark boundary corresponds to the setpoint positions predetermined on the projection surface 54 according to the multiplicity of predetermined adjustment markings 58. The described steps may be repeated for the other reference marking 34 with a light beam 38' of the light source 36, in order to check the alignment of the motor vehicle headlamp in the dip-beam function.

Figure 5:
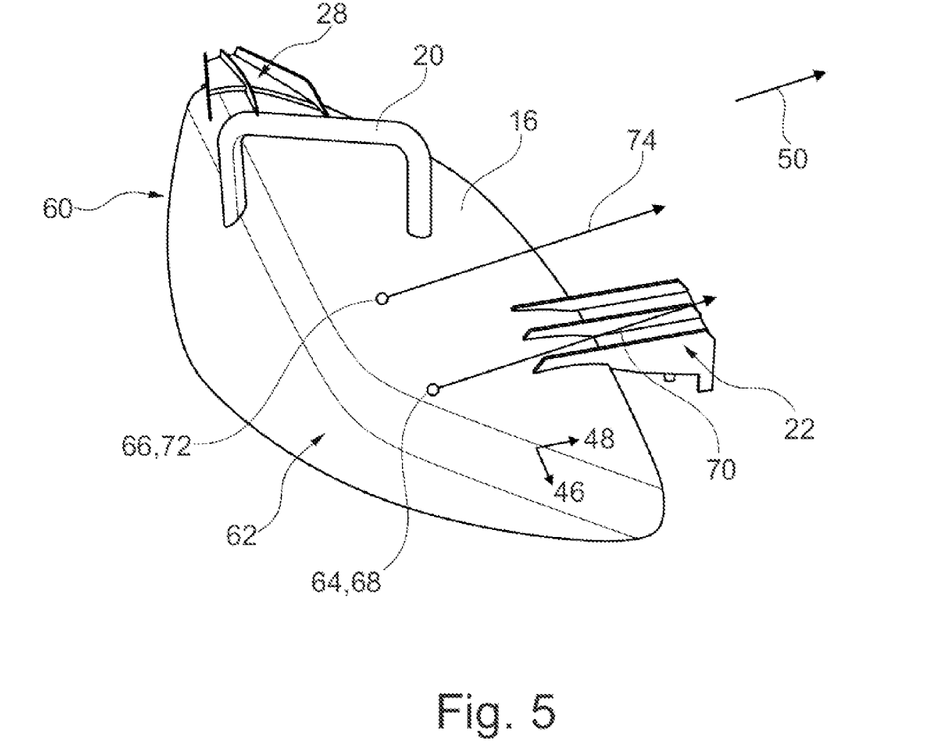
FIG. 5 is a schematic perspective representation of an alternative variation of the alignment checking apparatus holder in the orientation of a checking position, in a view obliquely from above, according to the teachings of the present disclosure.

FIG. 5 shows a schematic perspective representation of an alternative variation of the alignment checking apparatus holder 60 according to the disclosure of the headlamp checking apparatus 10 in the orientation of a checking position, in a view obliquely from above.

In order to reduce repetition, only the differences from the variation of the alignment checking apparatus holder 12 according to the disclosure according to FIG. 1 will be described below.

The headlamp checking apparatus 10 includes the alternative form of the alignment checking apparatus holder 60 to assist checking of the alignment of the motor vehicle headlamp installed in the body of the motor vehicle 52 and two light sources 68, 72. The light sources 68, 72 respectively contain a laser diode and a collimator lens arranged close to the laser diode, similar to the arrangement in a laser pointer, so that a substantially parallel light beam 70, 74, which is directed at the projection surface 54, is generated during operation of each of the laser diodes. The light sources 36, 42 from FIG. 3 arranged in a fixed position on the reference markings 56, 56' of the projection surface 54 are omitted.

In the alternative variation of the alignment checking apparatus holder 60 according to the disclosure, the base body 62 comprises two reference markings 64, 66, which are configured as a starting point respectively of one of the light beams 70, 74 of the two light sources 68, 72.

In one form, the reference markings 64, 66 are equipped with holding elements respectively for holding one of the light sources 68, 72. The holding elements may, in one form, be configured as bearing and guiding surfaces on which screw elements for fastening the light sources 68, 72 are arranged. The bearing and guiding surfaces of the holding elements may also be configured so as to be integrated in the base body 62. Such holding elements are familiar to the person skilled in the art and therefore need not be explained in further detail.

Each of the two light sources 68, 72 has a predetermined orientation with respect to the multiplicity of form-fit elements 22, 28. Furthermore, the reference markings 64, 66 are arranged separated from one another in a direction transverse to the forward driving direction 50 of the motor vehicle 52 (FIG. 3).

Each of the two light sources 68, 72 is intended to emit one of the light beams 70, 74, employing a spatial relation can be established between one of the predetermined reference markings 56, 56' on the projection surface 54 and one of the reference markings 64, 66 on the base body 62.

In this case, one of the reference markings 64 and the light beam 70 starting therefrom is assigned to a dip-beam function of the motor vehicle headlamp, and the other of the reference markings 66 and the light beam 74 starting therefrom is assigned to a full-beam function of the motor vehicle headlamp.

By virtue of the reference markings 64, 66 as a starting point of one of the light beams 70, 74, a spatial relation can be established with the reference point on the front side of the motor vehicle headlamp, employing the predetermined spatial arrangement of one of the reference markings 56, 56' on the projection surface 54 with respect to the relevant reference point of the motor vehicle headlamp can readily be achieved.

After the step 82 of operating one of the light sources 72 in order to emit a light beam 74 starting from one of the reference markings 66, in a subsequent step 84 the position of the light beam 74 on the projection surface 54 in relation to one of the respective reference markings 56 on the projection surface 54 is ascertained. The projection surface 54 is displaced and adjusted in the horizontal and/or vertical direction in a further step 86 until a position of the light beam 74 on the projection surface 54 coincides with the selected reference marking 56. The further steps for checking or adjustment may then be carried out as described above. In order to check the dip-beam function of the motor vehicle headlamp, the described steps may be repeated using the other reference marking 64 and a light beam 70 of the light source 68.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An alignment checking apparatus holder to assist checking of an alignment of a motor vehicle headlamp installed in a body of a motor vehicle, the alignment checking apparatus holder comprising:
   a base body;
   at least one reference marking on the base body, wherein the at least one reference marking on the base body is visually perceptible from an outside in a checking position; and
   multiple form-fit elements rigidly connected to the base body and configured to engage multiple vehicle form-fit elements of the motor vehicle to provide form-fit connections therebetween, the multiple vehicle form-fit elements being part of the motor vehicle, wherein:
   the form-fit elements are provided in two mutually independent spatial directions, and
   the at least one reference marking has a predetermined position with respect to the multiple form-fit elements.

2. The alignment checking apparatus holder according to claim 1, wherein the at least one reference marking is a symbol on a front upper side of the base body.

3. The alignment checking apparatus holder according to claim 1, wherein in that the at least one reference marking is arranged on a front upper side of the base body and is provided as a starting point of a light beam.

4. The alignment checking apparatus holder according to claim 1, wherein in that the multiple form-fit elements are provided as protrusions, substantially arranged horizontally in a checking position of the base body in two mutually independent spatial directions, wherein at least one web element respectively overhangs the protrusion in a downward direction from a plurality of end regions.

5. The alignment checking apparatus holder according to claim 1 further comprising at least one gripping element connected firmly to the base body and, in a checking position, is arranged on an upper side of the base body.

6. The alignment checking apparatus holder according to claim 5, wherein the at least one gripping element is a U-shaped handle firmly connected to the base body.

7. The alignment checking apparatus holder according claim 1, wherein the two mutually independent spatial directions are perpendicular to each other.

8. The alignment checking apparatus holder according to claim 1, wherein the base body includes an elongated oval general shape having a convexly configured upper side and a concavely configured lower side.

9. A headlamp checking apparatus for checking the alignment of a motor vehicle headlamp installed in a body of a motor vehicle, the headlamp checking apparatus comprising:
   an alignment checking apparatus holder according to claim 1, and
   at least one light source configured for an emission of a light beam, wherein a spatial relation between a predetermined reference marking on a projection surface at a predetermined distance outside the motor vehicle and the at least one reference marking on the base body can be established.

10. The headlamp checking apparatus according to claim 9 further comprising at least two light sources, wherein the base body of the alignment checking apparatus holder comprises two reference markings, one of the light sources being held at a location of each of the reference markings and having a predetermined orientation with respect to the multiple of form-fit elements, and the reference markings being arranged separated from one another in a direction transverse to a forward driving direction of the motor vehicle.

11. The headlamp checking apparatus according to claim 9, wherein the at least one light source includes a laser diode.

12. A method for checking the alignment of a motor vehicle headlamp installed in a body of a motor vehicle using a headlamp checking apparatus according to claim 9, the method comprising:
   producing the form-fit connections between each form-fit element of the alignment checking apparatus holder and the respective form-fit element corresponding thereto, that is part of the motor vehicle headlamp or of the body of the motor vehicle;
   operating the at least one light source to emit at least one light beam between a projection surface having a multiple of predetermined adjustment markings at a predetermined distance in front of the motor vehicle and the alignment checking apparatus holder;
   ascertaining a position of the light beam or positions of the light beams on the projection surface in relation to a respective reference marking on the projection surface or on the base body in relation to the at least one reference marking;
   adjusting the projection surface in a plane provided perpendicularly to the forward driving direction and at a predetermined distance from the base body until a position of the light beam or positions of the light beams coincides with the respective reference marking on the projection surface or a position of the light beam or positions of the light beams coincides respectively with one of the reference markings on the base body; and
   comparing a light distribution of the motor vehicle headlamp with the multiple of predetermined adjustment markings of the projection surface.

13. The method according to claim 12 further comprising:
   releasing the form-fit connections between the form-fit elements of the base body and the corresponding form-fit elements;
   removing the alignment checking apparatus holder from the checking position; and
   adjusting an optical axis of the motor vehicle headlamp according to the multiple of predetermined adjustment markings.

14. The method according to claim 12, wherein that the at least one reference marking is a symbol on a front upper side of the base body.

15. The method according to claim 12, wherein the at least one reference marking is arranged on a front upper side of the base body and is a starting point of a light beam.

16. The method according to claim 12, wherein:
the form-fit elements are protrusions, substantially arranged horizontally in a checking position, of the base body in two mutually independent spatial directions, and
at least one web element respectively overhangs the protrusion in a downward direction from a plurality of end regions.

17. The method according to claim 12 further comprising:
firmly connecting at least one gripping element to the base body; and
in a checking position, arranging the at least one gripping element on an upper side of the base body.

18. The method according to claim 17, wherein:
the at least one gripping element is a U-shaped handle, and
ends of U-shaped handle are firmly connected to the base body.

19. The method according to claim 12, wherein the base body and the multiple of form-fit elements are formed in one piece.

20. The method according to claim 12, wherein the base body includes an elongated oval general shape having a convexly configured upper side and a concavely configured lower side.

* * * * *